(12) United States Patent
Saxe et al.

(10) Patent No.: US 6,606,965 B2
(45) Date of Patent: Aug. 19, 2003

(54) STACKABLE PET SHELTER

(75) Inventors: Lucas Saxe, Laguna Beach, CA (US); Patrick Douglas, Minneapolis, MN (US)

(73) Assignee: Firstrx, Inc., Aliso Viejo, CA (US)

( * ) Notice: Subject to any disclaimer, the term of this patent is extended or adjusted under 35 U.S.C. 154(b) by 0 days.

(21) Appl. No.: 09/948,506

(22) Filed: Sep. 6, 2001

(65) Prior Publication Data

US 2002/0185082 A1 Dec. 12, 2002

(51) Int. Cl.[7] .................................................. A01K 1/00
(52) U.S. Cl. ...................................... 119/482; 119/498
(58) Field of Search ................................ 119/498, 482, 119/496, 497, 165

(56) References Cited

U.S. PATENT DOCUMENTS

| | | | |
|---|---|---|---|
| 3,195,505 A | | 7/1965 | Hauth et al. |
| 3,710,761 A | * | 1/1973 | Gregory ..................... 119/496 |
| 4,006,713 A | | 2/1977 | Hawley, III .................. 119/19 |
| 4,201,153 A | | 5/1980 | Nace ............................ 119/3 |
| 4,372,251 A | | 2/1983 | Keith .......................... 119/16 |
| 4,852,520 A | | 8/1989 | Goetz ........................ 119/19 |
| D327,143 S | * | 6/1992 | Dickinson .................. 119/482 |
| 5,154,137 A | | 10/1992 | Stanaland ................... 119/19 |
| 5,220,885 A | * | 6/1993 | Goetz ....................... 119/165 |
| 5,253,612 A | * | 10/1993 | Goetz ........................ 119/496 |
| D349,980 S | | 8/1994 | Northrop et al. ........... D30/108 |
| 5,462,015 A | * | 10/1995 | Murphy ..................... 119/496 |
| D364,712 S | | 11/1995 | Murphy et al. ............ D30/108 |
| D366,541 S | | 1/1996 | Bradburn et al. .......... D30/112 |
| D367,732 S | | 3/1996 | Murphy et al. ............ D30/108 |
| 5,551,371 A | | 9/1996 | Markey et al. ............. 119/499 |
| 5,575,239 A | * | 11/1996 | Bradburn et al. .......... 119/484 |
| D387,507 S | | 12/1997 | Willinger et al. .......... D30/108 |
| 6,182,611 B1 | * | 2/2001 | Marchioro ................. 119/453 |

OTHER PUBLICATIONS

Printout og website petmate.com for items 25233 (Country Barn), 25152 (Petbarn) and 25101 (Barnhome).*
Doskocil Manufacturing Company, Inc., Animal Cage Assembly Instructions, Dec. 31, 1984.
Doskocil Manufacturing Company, Inc., Press Release: "Petmate Introduces New Nested Litter Pan and Hood", Apr. 30, 1993.
Doskocil Manufacturing Company, Inc., Petco/Doskocil Sales Presentation Brochure, Sep. 21, 1999.

* cited by examiner

Primary Examiner—Charles T. Jordan
Assistant Examiner—Kimberly S. Smith
(74) Attorney, Agent, or Firm—Knobbe, Martens, Olson & Bear, LLP

(57) ABSTRACT

A pet shelter that enables efficient stacking of multiple shelters in a bottom-top-bottom-top-bottom-etc. arrangement is provided. The shelter comprises a bottom section and a top section. Both the top and bottom sections are, preferably hollow rectangular boxes with one missing side. Both sections have sloping sidewalls and a substantially U-shaped opening in one sidewall. The sidewalls of the top and bottom sections slope at roughly equal angles. The legs of the U-shaped openings are bent at roughly equal angles on both the top and bottom sections. The height of the top section is roughly equal to the height of the bottom section. The roof of the top section has a very gradual slope, such that the peak of the roof does not obstruct insertion of a top section into a bottom section. Thus, the top and bottom sections are configured such that an inverted top section fits snugly within an interior of a bottom section, and a bottom section fits snugly within an interior of an inverted top section.

11 Claims, 7 Drawing Sheets

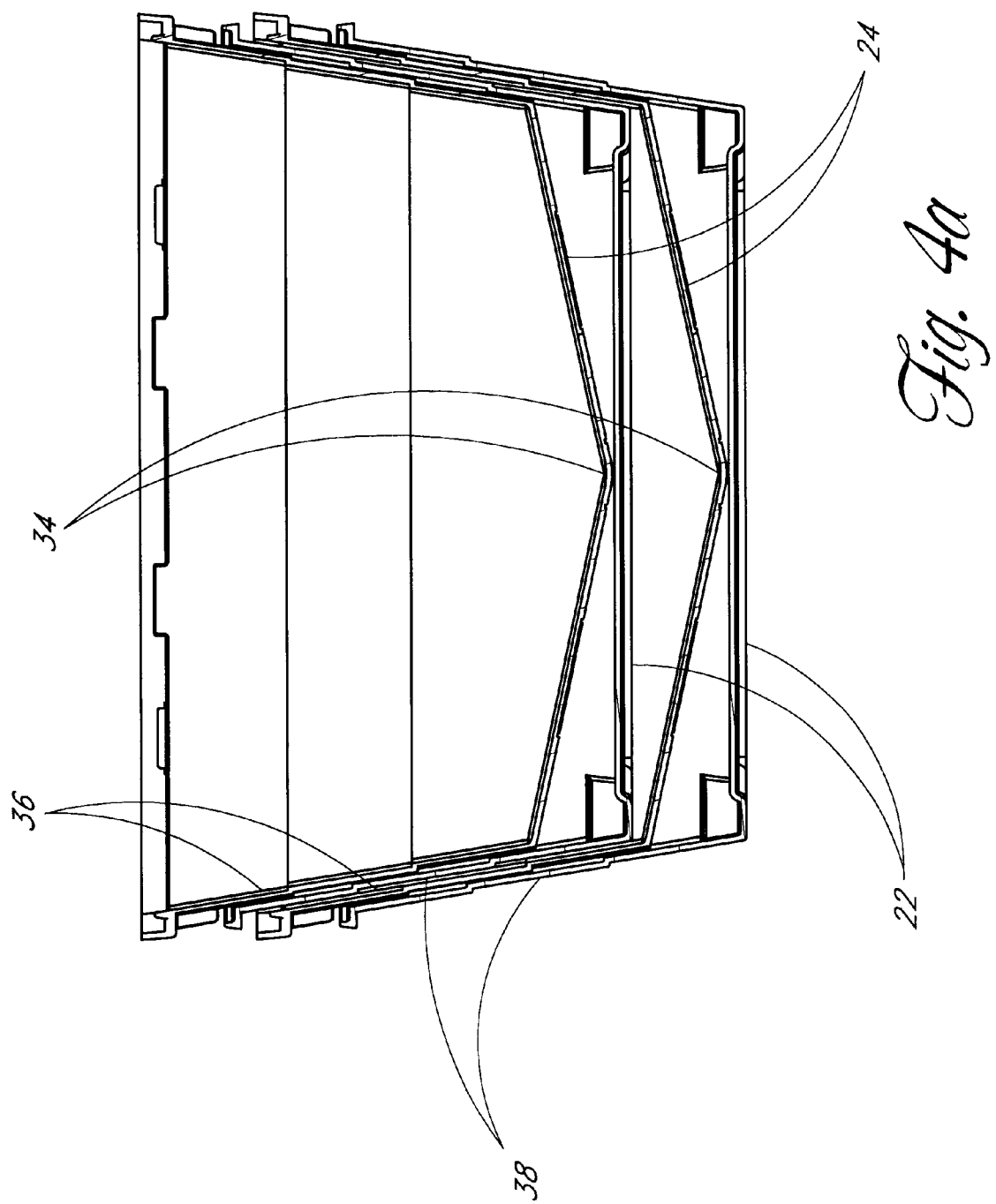

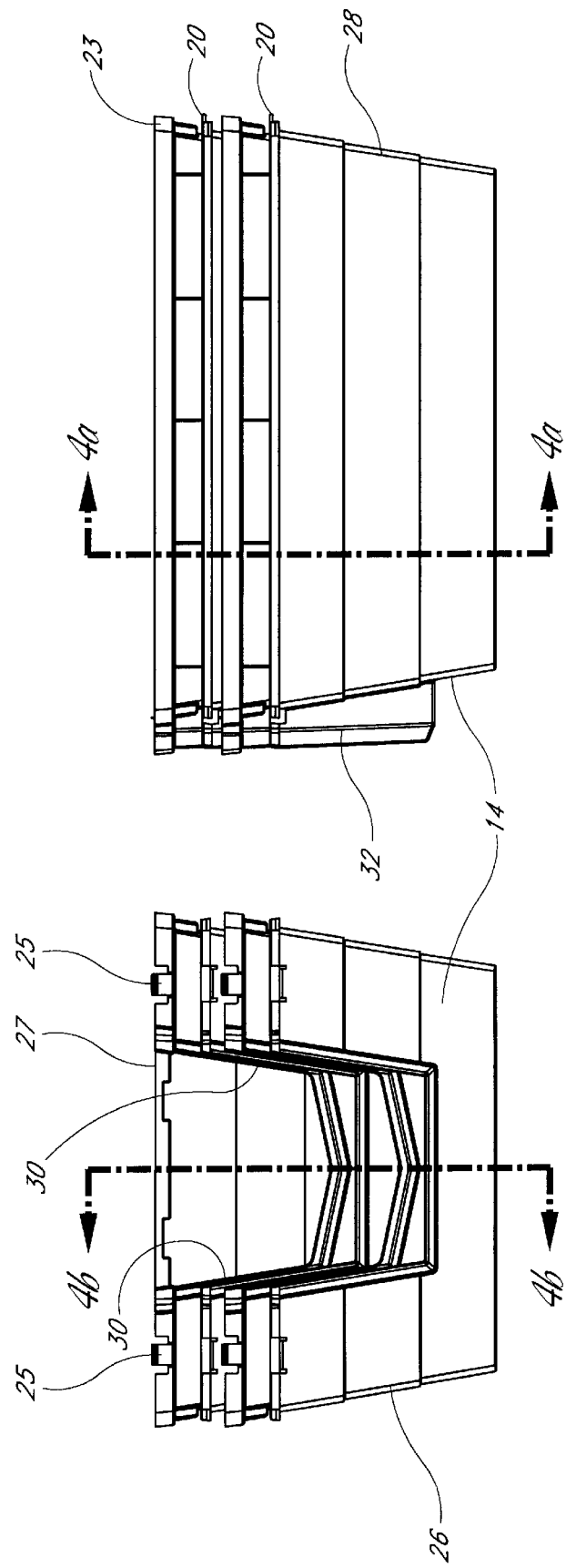

STACKABLE PET SHELTER

BACKGROUND OF THE INVENTION

1. Field of the Invention

The invention relates to pet enclosures that are readily stackable so as to occupy as little retail space as possible. More particularly, the pet shelter includes a top section and a bottom section, and both the top and bottom sections fit snugly within each other when one section is inverted.

2. Description of the Related Art

Pet shelters that are available for purchase at retail pet stores are well known. Many of these shelters have a two-piece construction, consisting of a top section and a bottom section. Typically, the bottom section is a substantially rectangular box with a flat bottom and an open top. The top section is often shaped like a prism, with a triangular cross-section. This top section thus provides the shelter with a steeply sloped roof. This slope allows the roof to easily shed rain water, and discourages pets from climbing on top of the shelter.

U.S. Pat. No. Des. 349,980 to Northrop et al. discloses an ornamental design for a pet house. The house has a two-piece construction. The bottom section comprises a rectangular box with an open top and sidewalls that gradually slope outward from the bottom. The top section is shaped generally like a prism, with an open rectangular bottom and seven walls. The two end walls are generally hexagonal, the bottom edge of each being the longest edge. One end face of both the bottom and top sections includes a substantially U-shaped opening. When the top and bottom sections are assembled, the open ends of the U-shaped openings face each other, creating a substantially rectangular opening that serves as an entrance/exit for the shelter.

U.S. Pat. No. Des. 366,541 to Bradburn et al. discloses a doghouse that is remarkably similar in shape and design to the Northrop shelter. The main difference between the Bradburn and Northrop shelters is that the end faces of the top section of the Bradburn shelter have only five edges, whereas the end faces of the top section of the Northrop shelter have six edges.

In both the Northrop and Bradburn designs, the top section is readily insertible within the interior of the bottom section once the top section has been inverted. Because of the shapes and sloped edges of the top sections of both designs, however, the bottom section does not fit snugly within the interior of the top section. The base of the bottom section is too wide to fit very far into the open end of the top section. Thus, a stack of either of these shelters that was arranged bottom, top, bottom, top, bottom, etc. would be very unstable and quite high in relation to the number of shelters in the stack.

U.S. Pat. No. 5,551,371 to Markey et al. discloses a pet enclosure that has a generally hollow box-shaped base and a roof hingedly attached to the base. The roof is gable-styled, with triangular end faces. The side edges of each triangle slope sharply. The side edges of the bottom section slope very gradually. Therefore, the bottom section will not nest within the inverted top section.

U.S. Pat. No. 5,154,137 to Stanaland discloses a whelping box having a top section and a bottom section. Both sections are substantially rectangular boxes with open ends. The bottom section includes a removable insert having a ledge around the inside surface of three walls. The insert is nearly identical to the bottom section, but is slightly smaller for snug engagement with the interior of the bottom section. Even without the insert, the top and bottom sections are not capable of very efficient stacking. The sides of the top section include ventilation openings that protrude from the outer surface of each side. Thus, the openings obstruct the path of the inverted top section as it is slid into the bottom section. Furthermore, the ledge around the inside of the insert creates empty space beneath the ledge into which neither an inverted top section nor an inverted bottom section can advance.

In retail outlets, where pet shelters are often sold, display space is at a premium. Therefore, two-piece shelters are typically broken down into their separate sections so that the sections can be stacked, thereby maximizing the number of shelters per unit area of shelf space. Unfortunately, pet shelters having sloped roofs are not very amenable to efficient stacking. One way to stack these shelters is to create two stacks, one stack of bottom sections, and one stack of top sections. This method has the obvious drawback of occupying double the shelf space of a single stack. This method also disadvantageously requires additional warehouse space and is expensive to transport.

In order to eliminate one stack from the above method, another method of stacking is to place the stack of top sections upon the stack of bottom sections. This method reduces the amount of shelf space occupied by the two stacks, but makes the job of removing one pet shelter from the stack very difficult. When a customer wishes to purchase one of the shelters, he or she or a store employee must remove the entire stack of top sections from the stack of bottom sections in order to extract a bottom section. The stack of top sections is sometimes quite heavy, making this method very inconvenient.

Another method of stacking is to invert a top section and place it inside a bottom section. This method eliminates the difficulty of having to move a large stack of top sections in order to extract a bottom section. Depending upon the angle of slope in the top section, however, this method may create a large amount of empty space between the top and bottom sections. With very steeply sloped roofs, the top section may even lean to one side within the bottom section. Further, a second bottom section typically will not fit within the inverted top section, at least not without creating a very large amount of empty space between the two. Such a stack tends to be very unstable and unsafe. In addition the stack occupies a great deal of vertical space compared to the number of pet shelters in the stack.

Thus a pet shelter that is amenable to stacking in a bottom-top-bottom-top-bottom-etc. fashion would be of significant advantage to pet store owners and pet product consumers. The device should enable a stable stack that is comparatively short in comparison to the number of shelters in the stack.

SUMMARY OF THE INVENTION

The preferred embodiments of the stackable pet shelter have several features, no single one of which is solely responsible for their desirable attributes. Without limiting the scope of this invention as expressed by the claims that follow, its more prominent features will now be discussed briefly. After considering this discussion, and particularly after reading the section entitled "Detailed Description of the Preferred Embodiments," one will understand how the features of the preferred embodiments provide advantages, which include ready stackability in an efficient and stable manner.

Preferred embodiments of the stackable pet shelter comprise a bottom section and a top section that mate to form a sturdy shelter. The bottom section is shaped substantially as a hollow rectangular box having a floor and four sidewalls. The sidewalls slope outwardly, and a first sidewall includes a substantially U-shaped opening. The legs of the U are bent slightly outward. The top section is shaped substantially as a hollow six-walled structure having two opposite rectangular walls, two opposite pentagonal walls and a peaked roof. The sidewalls slope outwardly away from the roof, and a first sidewall includes a substantially U-shaped opening, with the legs of the U bent slightly outward.

The top and bottom sections are configured such that an inverted top section fits snugly within an interior of a bottom section, and a bottom section fits snugly within an interior of an inverted top section. Thus, preferred embodiments of the pet shelter enable efficient stacking of multiple shelters in a bottom-top-bottom-top-bottom-etc. arrangement. Several features of the pet shelter contribute to its stackability. First, the sidewalls of the top and bottom sections slope at roughly equal angles. Second, the legs of the U-shaped openings are bent at roughly equal angles on both the top and bottom sections. Third, the height of the top section is roughly equal to the height of the bottom section. Fourth, the roof of the top section has a very gradual slope, such that the peak of the roof does not obstruct nesting of a top section within a bottom section.

BRIEF DESCRIPTION OF THE DRAWINGS

The preferred embodiments of the stackable pet shelter, illustrating its features, will now be discussed in detail. These embodiments depict the novel and non-obvious stackable pet shelter shown in the accompanying drawings, which are for illustrative purposes only. These drawings include the following figures, in which like numerals indicate like parts:

FIGS. 4a and 4b are, respectively, front section and right-side section views of the stackable pet shelter of FIG. 1, illustrating bottom-top-bottom-top stacking; and FIGS. 5a and 5b are, respectively, front and right-side views of the stackable pet shelter of FIG. 1, illustrating bottom-top-bottom-top stacking.

DETAILED DESCRIPTION OF THE PREFERRED EMBODIMENTS

Figure 1:
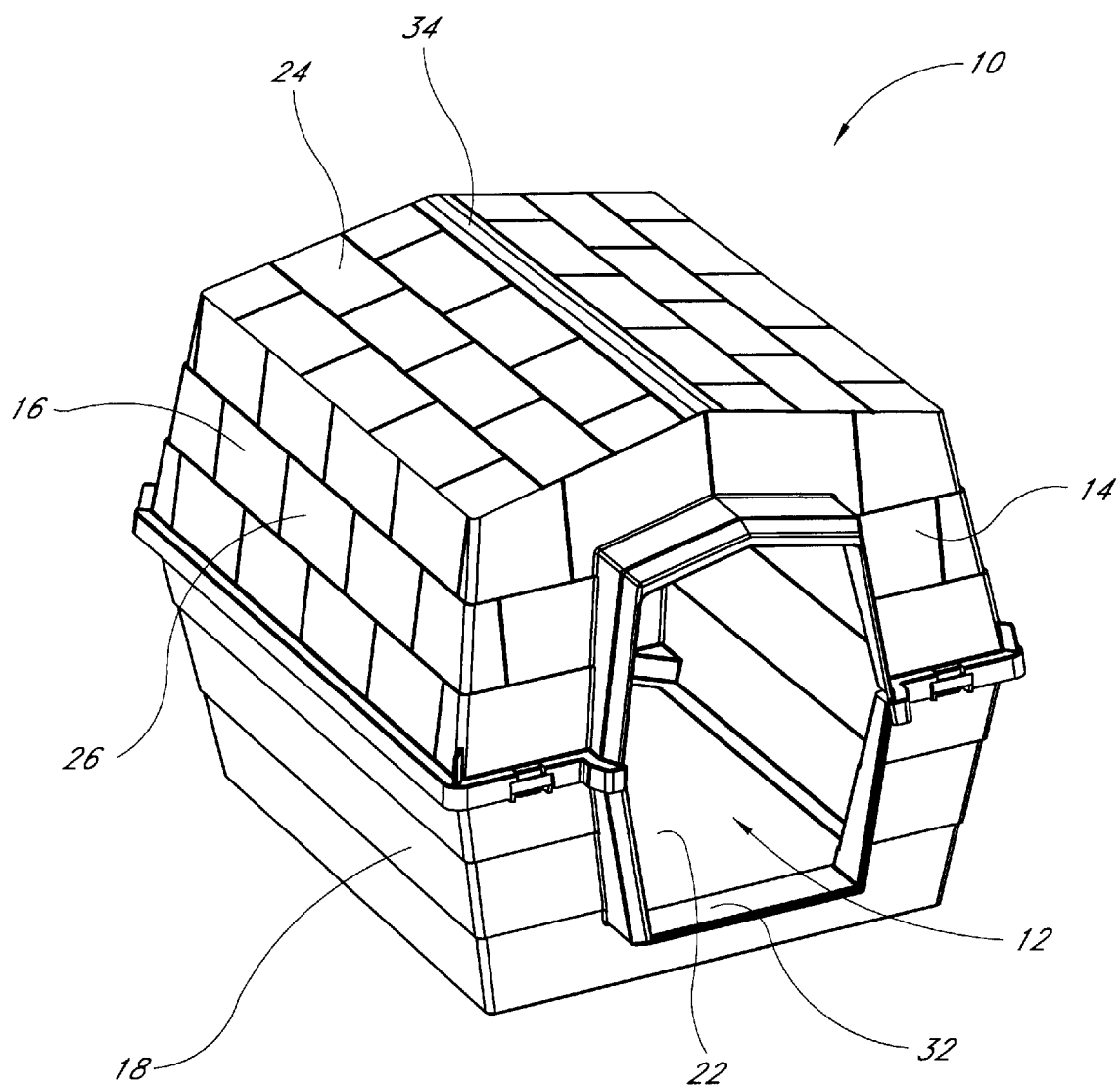
FIG. 1 is a front perspective view of a preferred embodiment of the stackable pet shelter.

As FIG. 1 illustrates, a preferred embodiment of the stackable pet shelter 10 includes a hollow, substantially rectangular box with a substantially rectangular opening 12 in a front wall 14. One of skill in the art will appreciate, however, that the shelter 10 may include any number of sides or curved surfaces. The shelter 10 may, for example, be substantially triangular in plan aspect, hexagonal, octagonal or even round.

Figure 3:
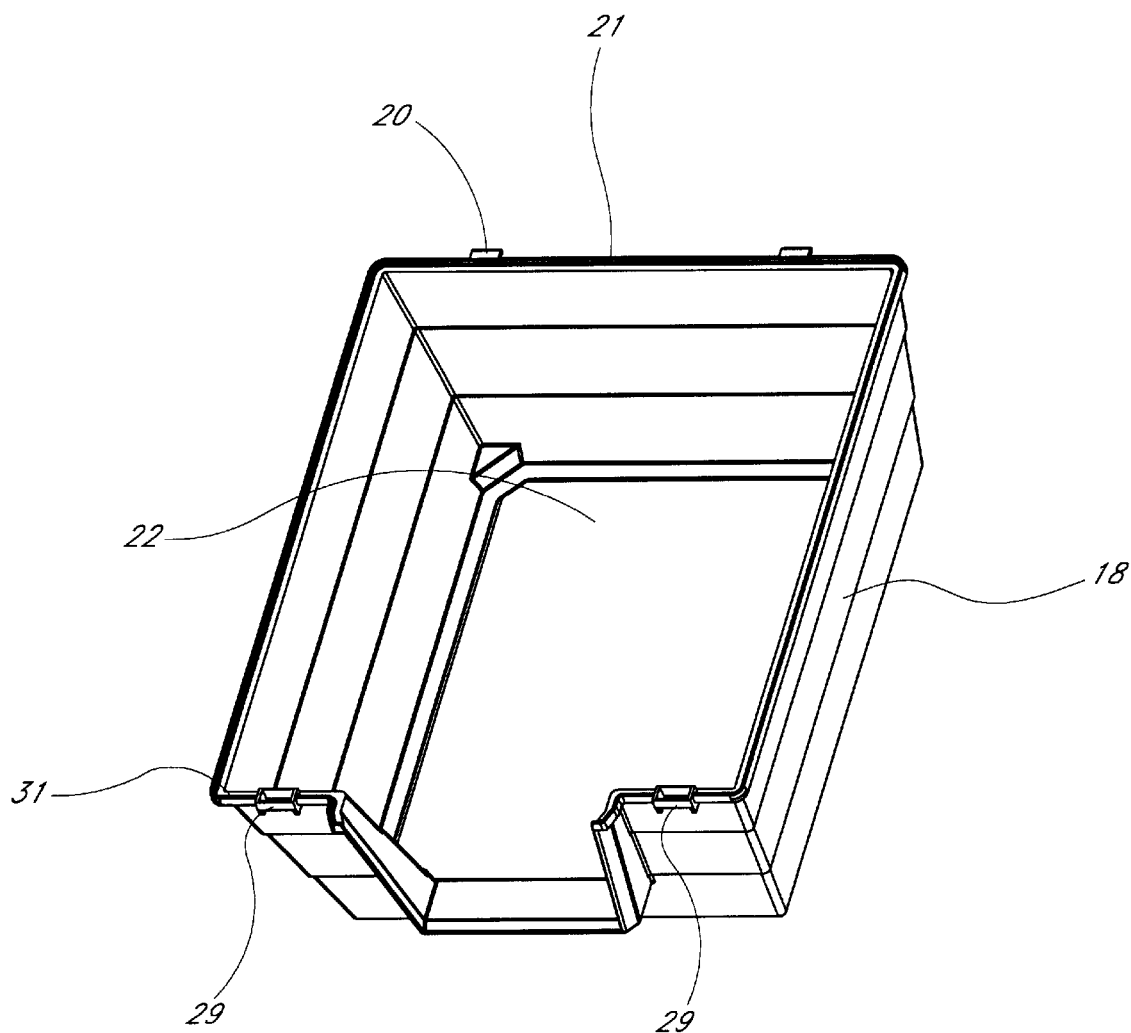
FIG. 3 is a front perspective view of a bottom section of the stackable pet shelter of FIG. 1.

The shelter 10 is preferably constructed of a high-impact plastic, or another material that is lightweight and durable such as wood or fiberglass. The shelter 10 is constructed of two sections, a top section 16 and a bottom section 18. Both the top and bottom sections are shaped substantially as rectangular boxes with one missing side, and a substantially U-shaped opening in a side adjacent to the missing side. FIG. 3 illustrates the bottom section 18 in isolation.

The top and bottom sections of the shelter may be secured to one another with tab and slot connectors. Generally horizontally extending tabs 20 (FIGS. 3, 4b and 5b) on a back upper edge 21 of the bottom section 18 mate with generally horizontally oriented slots (not shown) on a back lower edge 23 (FIG. 5b) of the top section 16. Generally vertically extending tabs 25 (FIG. 5a) on a front lower edge 27 of the top section 16 mate with generally vertically oriented slots 29 (FIG. 3) on a front upper edge 31 of the bottom section 18. In profile, the tabs 25 resemble an arrowhead that has been bisected lengthwise. Thus, a narrow leading portion of each tab 25 is able to penetrate a slot 29. Once the tab 25 advances through the slot 29 past a shoulder portion, the tab 25 snaps into place and can only be removed from the slot 29 by deforming the slot 29.

To assemble the shelter 10, the top and bottom sections are oriented such that their missing sides face each other and the open ends of both U-shaped openings are aligned. With the bottom section 18 resting on a flat horizontal surface, the back lower edge 23 of the top section is brought into contact with the back upper edge 21 of the bottom section 18 such that the tabs 20 extend through the slots on the top section. Next, the front lower edge 27 of the top section 16 is brought into contact with the front upper edge 31 of the bottom section 18, such that the tabs 25 snap into and extend through the slots 29.

One of skill in the art will appreciate that the illustrated manner of attaching the top section 18 to the bottom section 16 is merely exemplary. Many other methods of attachment are equally suitable, including providing horizontally extending lip members on both sections that receive vertically extending pins or bolt and nut fasteners, or providing a vertically extending and overlapping lip on the top portion that receives horizontally extending pins or bolt and nut fasteners. Alternatively, an interference fit or any other attachment mechanisms known to those of skill in the art may be used.

The side of the bottom section 18 opposite its missing side defines a shelter floor 22, while the side of the top section 16 opposite its missing side defines a shelter roof 24. The remaining sides of the two sections define shelter walls. The shelter floor 22 may include grooves (not shown) for channeling water away from a pet.

Two shelter 10 walls are preferably longer than the two remaining walls. The long walls define sidewalls 26, while the shorter walls define a front wall 14 and a back wall 28 of the shelter 10. The front wall 14 preferably includes a substantially rectangular opening 12 formed by the adjoining U-shaped openings of the top and bottom sections. The rectangular opening 12 defines a shelter entrance. One of skill in the art will appreciate that the shelter entrance may be any shape, such as triangular, hexagonal, octagonal, or even round. One of skill in the art will also appreciate that the shelter entrance may be formed in any of the shelter sidewalls.

Figure 2A:
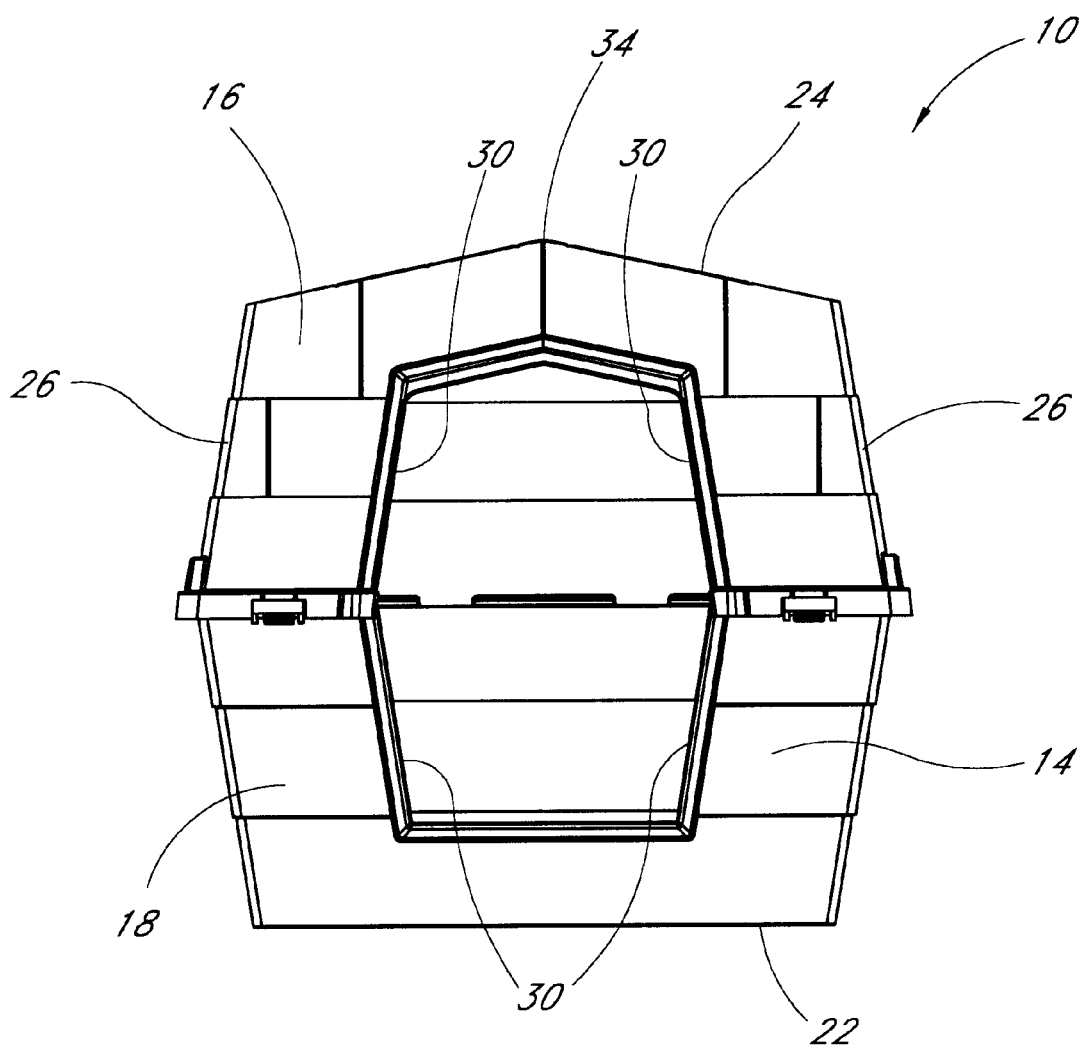
FIGS. 2a and 2b are, respectively, front elevational and right-side elevational views of the stackable pet shelter of FIG. 1.
Figure 2B:
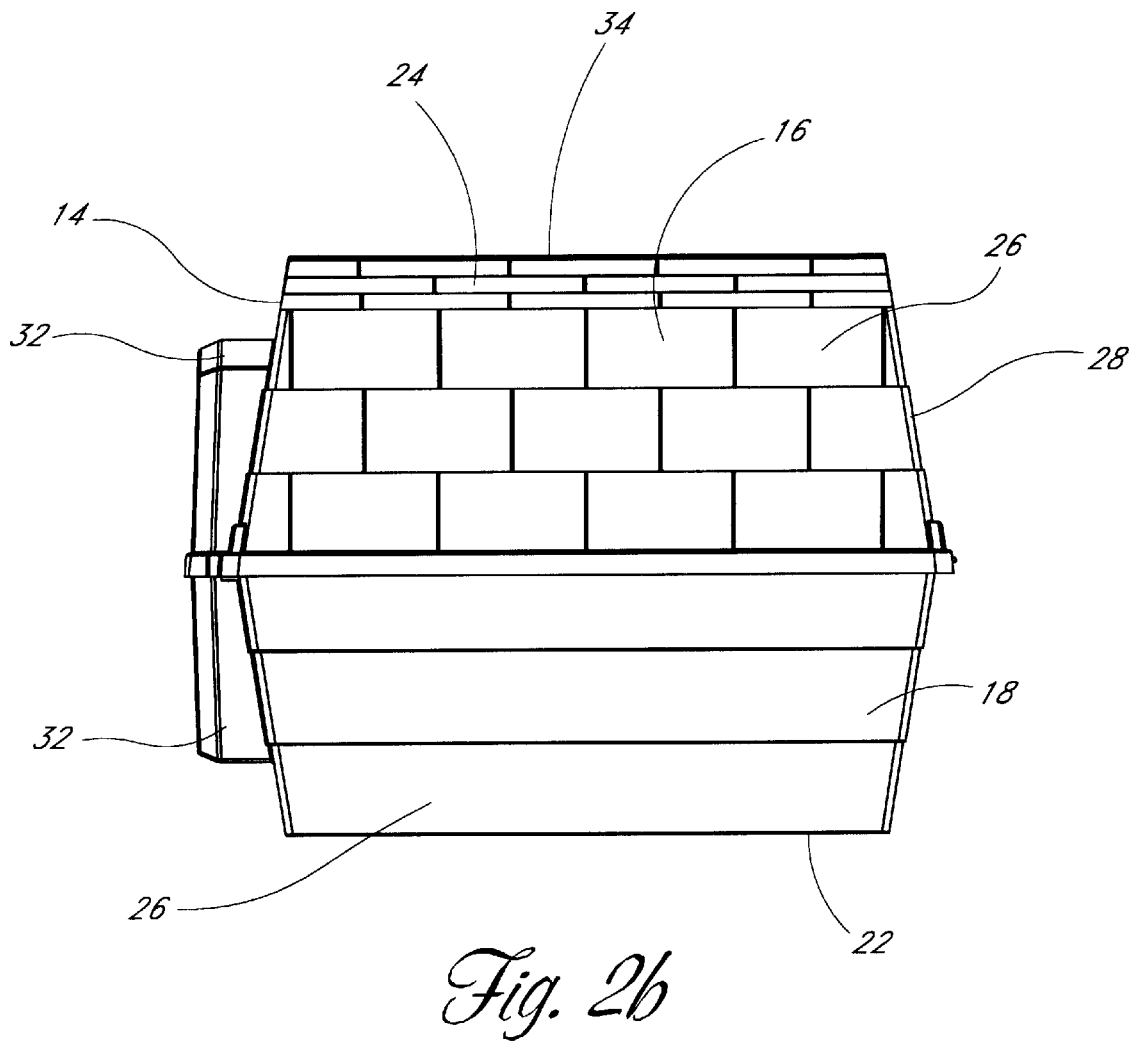

As best seen in FIGS. 2a and 2b, each of the shelter walls slopes gradually from vertical. For the top section 16, the walls slope inward from the missing side to the shelter roof 24. For the bottom section 18, the walls slope outward from the shelter floor 22 to the missing side. Thus, the shelter 10 is preferably widest at a point roughly equidistant from the shelter roof 24 and floor 22.

Legs 30 of each U-shaped opening are preferably bent outward, such that the legs 30 roughly parallel the shelter 10 walls, as best seen in FIG. 2a. Thus, the widest portion of the shelter entrance is at the junction of the top and bottom sections. As illustrated in FIG. 2b, a narrow lip 32 preferably extends outward from the shelter entrance. The lip 32 prevents water, such as rainwater, from entering the shelter 10. One of skill in the art will appreciate, however, that the lip 32 is not a necessary component of the shelter 10.

The shelter floor 22 is preferably crowned slightly so that moisture runs away from a pet in the shelter. Alternatively, the floor 22 can be flat or slightly sloped. The shelter roof 24 is preferably slightly peaked, such that a ridge 34 stretches along the center of the roof 24 from the front wall 14 to the back wall 28. The roof 24 thus slopes downward from the ridge 34 toward either sidewall 26. The slope preferably is steep enough to allow the shelter roof 24 to shed rainwater and to discourage pets from climbing on top of the shelter 10. However, the slope is preferably gradual enough to facilitate stacking and nesting of the shelter tops and bottoms, as explained below.

Figure 4B:
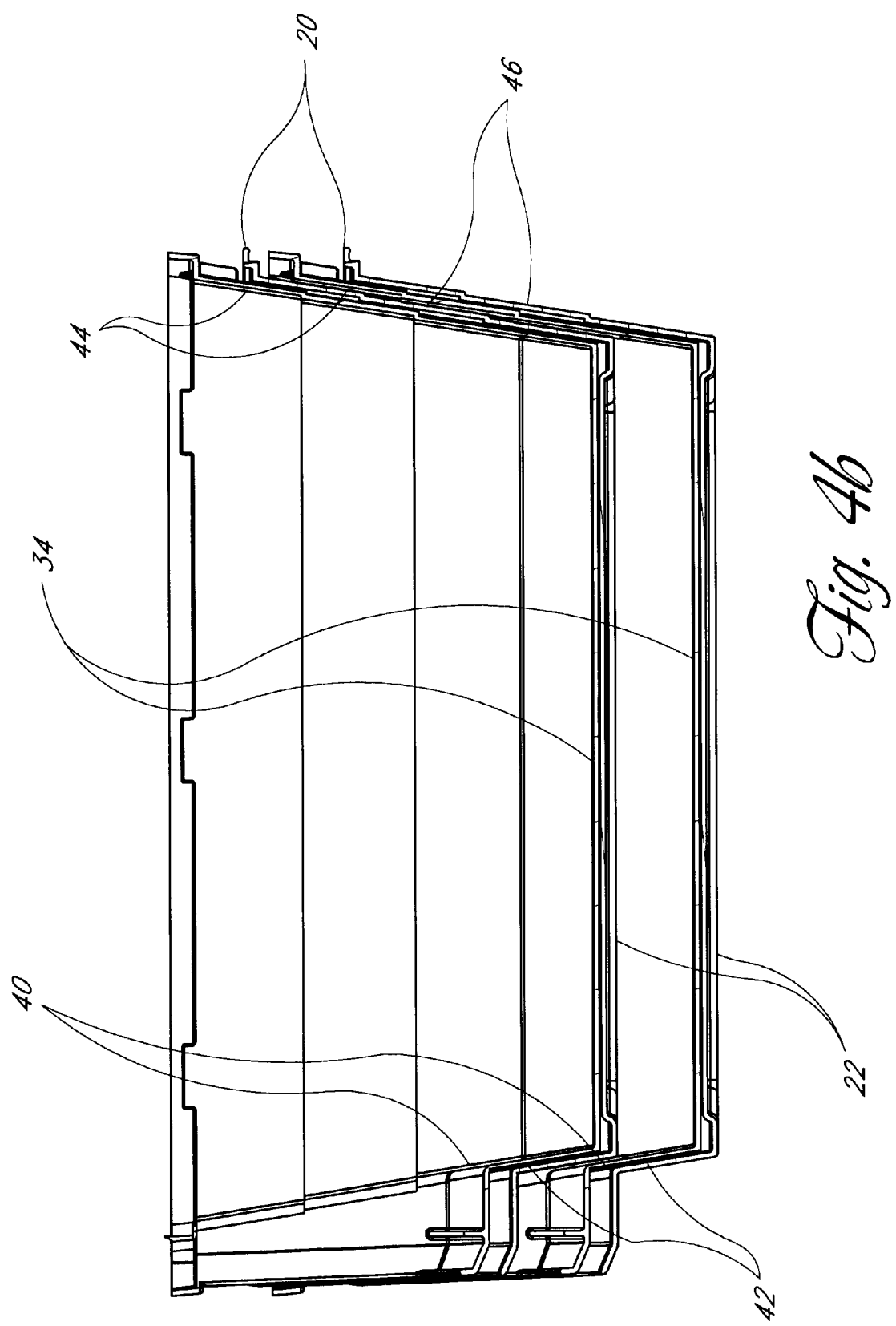

When the top section 16 is removed from the bottom section 18 and inverted, the top section 16 fits snugly within the interior of the bottom section 18, and the bottom section 18 fits snugly within the interior of the top section 16. FIGS. 5a and 5b illustrate a bottom-top-bottom-top stacking arrangement. FIGS. 4a and 4b illustrate the internal configuration of the various shelter walls in the stacked arrangement of FIGS. 5a and 5b.

As shown in FIG. 4a, the sidewalls 36 of each top section 16 rest against the sidewalls 38 of each bottom section 18, and vice versa. As shown in FIG. 4b, the front walls 40 of each top section 16 rest against the front walls 42 of each bottom section 18, and vice versa, and the rear walls 44 of each top section 16 rest against the rear walls 46 of each bottom section 18, and vice versa.

Also as shown in both FIGS. 4a and 4b, the ridge 34 of the top section 16 rests on the floor 22 of the bottom section 18. Further, as FIG. 4a illustrates, there is very little empty or wasted space between the top sections 16 and bottom sections 18.

The snug fit between the inverted top sections 16 and bottom sections 18 results from a combination of features of the two sections. One of skill in the art will appreciate, however, that not all of these features are required for snug nesting. The scope of the shelter 10 is not limited to a shelter having all of these features.

First, the front wall 14, back wall 28 and sidewalls 26 of the top section 16 slope at angles that are roughly equal to the slope of the front wall 14, back wall 28 and sidewalls 26, respectively, of the bottom section 18. Second, the legs 30 of the U-shaped opening in the top section 16 slope at roughly equal angles as the legs 30 of the U-shaped opening in the bottom section 18. Third, the top section 16 is approximately the same height as the bottom section 18. Fourth, the shelter floor 22 is generally flat, and the shelter roof 24 slopes very gradually.

The snug fit of inverted top sections within bottom sections and bottom sections within inverted top sections enables retailers to stack the shelters 10 in a bottom-top-bottom-top-bottom-etc arrangement. Thus, a large number of shelters 10 can be kept on hand by the retailer in a single, space-efficient stack. The space between each inverted top section 16 and bottom section 18 may include accessories for the shelter 10, such as a pad or a door. If such accessories are stored, the inverted top section and bottom section may be removably secured to retain the accessories therebetween and prevent loss or theft of the accessories.

The present invention also advantageously reduces the amount of warehouse space needed to store multiple pet shelters. Moreover, the present invention reduces transport costs of the shelters as more shelters fit within a standard shipping container.

In this configuration, the shelters 10 not only occupy relatively little inventory space, but a single shelter 10 can be removed from the top of the stack with minimal effort. Any accessories that the shelter 10 features may be already neatly packaged within. Furthermore, the snug fit of each section within the others leads to greater stability of a large stack. The stack is thus less prone to tipping over and causing injury.

SCOPE OF THE INVENTION

The above presents a description of the best mode contemplated for the present stackable pet shelter, and of the manner and process of making and using it, in such full, clear, concise, and exact terms as to enable any person skilled in the art to which it pertains to make and use this stackable pet shelter. This stackable pet shelter is, however, susceptible to modifications and alternate constructions from that discussed above which are fully equivalent. Consequently, it is not the intention to limit this stackable pet shelter to the particular embodiments disclosed. On the contrary, the intention is to cover all modifications and alternate constructions coming within the spirit and scope of the stackable pet shelter as generally expressed by the following claims, which particularly point out and distinctly claim the subject matter of the stackable pet shelter.

What is claimed is:

1. A stack of pet shelters, wherein each pet shelter comprises a top piece and a bottom piece, the stack comprising from bottom to top:
    a first bottom piece including a floor and four floor sidewalls extending from the floor in a generally upward direction;
    a first top piece including
        a roof including a center ridge and at least one slope extending from each side of the center ridge, and
        four roof sidewalls, wherein when the first top piece is inverted, the inverted first top piece nests within the first bottom piece such that a portion of an inside-facing side of each of the four floor sidewalls contacts a portion of an outside-facing side of each of the four roof sidewalls, thereby stabilizing the stack of pet shelters;
    a second bottom piece, wherein the second bottom piece nests within the inverted first top piece; and
    a second top piece, wherein the second top piece is inverted and nests within the second bottom piece.

2. The stack of claim 1, wherein the roof of each inverted top piece contacts the floor of the corresponding bottom piece, and a lower side of a rim about an upper end of each inverted top piece contacts an upper side of a rim about an upper end of each bottom piece.

3. The stack of claim 1, wherein a lower side of a rim about an upper end of the second bottom piece contacts an upper side of a rim about an upper end of the inverted first top piece.

4. The stack of claim 1, wherein substantially all of an outer surface of a roof sidewall of the inverted first top piece contacts an inner surface of a floor sidewall of the first bottom piece.

5. The stack of claim 4, wherein substantially all of an outer surface of a floor sidewall of the second bottom piece contacts an inner surface of a roof sidewall of the inverted first top piece.

6. The stack of claim 5, wherein substantially all of an outer surface of a roof sidewall of the inverted second top piece contacts an inner surface of a floor sidewall of the second bottom piece.

7. The stack of pet shelters of claim 1, wherein the floor sidewalls of the first bottom piece extend upwardly and outwardly from the floor of the first bottom piece.

8. A method of stacking multiple pet shelters in a single stack, wherein the pet shelters comprise a top piece and a bottom piece, comprising the steps of:

placing a first bottom piece on a flat surface;

inverting a first top piece including a sloped roof comprising a center ridge and at least one slope extending from each side of the center ridge, and four steeper sloped roof sidewalls;

inserting the inverted first top piece within an interior of the first bottom piece, wherein the inverted first top piece nests snugly within the first bottom piece which allows at least a portion of each of the four roof sidewalls to contact surfaces of the first bottom piece;

inserting a second bottom piece within an interior of the inverted first top piece, wherein the second bottom piece nests snugly within the inverted first top piece by having at least a portion of each outside-facing side of the second bottom piece in substantial contact with an inside-facing side of each of the four roof sidewalls of the inverted first top piece;

inverting a second top piece including a sloped roof comprising a center ridge and at least one slope extending from each side of the center ridge, and steeper sloped roof sidewalls; and inserting the inverted second top piece within an interior of the second bottom piece, wherein the inverted second top piece nests snugly within the second bottom piece.

9. A stack of pet shelters, wherein each shelter comprises a top piece and a bottom piece, said stack including a first inverted top piece nested within a first bottom piece and a second bottom piece nested within the first inverted top piece, wherein the first top piece includes
a rim around a periphery of the top piece,
a sloped roof having a center ridge, and
four sidewalls terminating with and including the rim, wherein at least one section of each of the four sidewalls contacts the first bottom piece to stabilize the stack, and wherein each shelter includes a protruding entrance or an exit configured to at least partially shield an interior of each shelter from precipitation.

10. The stack of pet shelters of claim 9, wherein each shelter does not include ventilation slots other than the protruding entrance or the exit.

11. The stack of pet shelters of claim 9, wherein a topmost point of the sloped roof when the roof is not inverted contacts the first bottom piece when the roof is inverted.

* * * * *